US009956571B2

United States Patent
Tatia

(10) Patent No.: US 9,956,571 B2
(45) Date of Patent: May 1, 2018

(54) PAINT SHIELD CLAMP

(71) Applicant: Mauro Tatia, Kennesaw, GA (US)

(72) Inventor: Mauro Tatia, Kennesaw, GA (US)

( * ) Notice: Subject to any disclaimer, the term of this patent is extended or adjusted under 35 U.S.C. 154(b) by 120 days.

(21) Appl. No.: 14/560,770

(22) Filed: Dec. 4, 2014

(65) Prior Publication Data

US 2015/0151326 A1    Jun. 4, 2015

Related U.S. Application Data

(60) Provisional application No. 61/911,601, filed on Dec. 4, 2013.

(51) Int. Cl.
*B05C 21/00* (2006.01)
*F16B 2/10* (2006.01)
*B05B 15/04* (2006.01)

(52) U.S. Cl.
CPC ........ *B05B 15/0475* (2013.01); *B05B 15/045* (2013.01); *B05B 15/0437* (2013.01); *B05C 21/005* (2013.01); *F16B 2/10* (2013.01)

(58) Field of Classification Search
None
See application file for complete search history.

(56) References Cited

U.S. PATENT DOCUMENTS

| 4,085,703 | A | 4/1978 | Glowacki | |
|---|---|---|---|---|
| 5,103,762 | A | 4/1992 | Long | |
| 6,808,794 | B1 | 10/2004 | Mattox | |
| 7,854,212 | B2 | 12/2010 | Queiroz | |
| 8,104,426 | B2 | 1/2012 | Gringer | |
| 2005/0035221 | A1* | 2/2005 | Gathright | B05B 15/0475 239/461 |
| 2010/0126416 | A1* | 5/2010 | Gringer | B05B 15/0475 118/504 |
| 2012/0324665 | A1* | 12/2012 | Miller | A47L 1/06 15/144.1 |
| 2015/0003918 | A1* | 1/2015 | Peterson | E02B 3/068 405/218 |

* cited by examiner

*Primary Examiner* — Jethro M Pence
(74) *Attorney, Agent, or Firm* — Global Intellectual Property Agency, LLC; Daniel Enea

(57) ABSTRACT

The present invention provides a paint shield clamp that includes a clamp having substantially a C-shape with an upper portion, lower portion and a rear ledge. The upper portion is rectangular in shape and includes a first edge, a second edge, an interior surface and an exterior surface. The lower portion extends outwardly beyond the extent of the upper portion. The lower portion is substantially trapezoidal in shape and includes a third edge, a fourth edge. The third edge is attached to the second edge of the upper portion. The fourth edge is offset from the interior surface of the upper portion to form an opening between the upper portion and the lower portion. A rear ledge is attached to the second edge of the upper portion and extends rearwardly therefrom. An elongated handle is pivotally attached to the rear ledge.

7 Claims, 4 Drawing Sheets

PAINT SHIELD CLAMP

CROSS REFERENCE TO RELATED APPLICATION

This application claims the benefit of U.S. Provisional Application No. 61/911,601 filed on Dec. 4, 2013. The above identified patent application is herein incorporated by reference in its entirety to provide continuity of disclosure.

BACKGROUND OF THE INVENTION

Field of the Invention

The present invention relates to home improvement and painting accessories. More specifically, the present invention pertains to an improved painting shield that comprises a substantially C-shaped clamp. The shield is designed to clamp to the shingles on a roof, and prevent any unintended painting of the shingles while a wall, fascia, or another adjacent surface is being painted. The present invention further includes an elongated handle that is pivotally attached to the clamp.

Whenever painting or spray painting is done, a paint shield is often necessary. A paint shield is a piece of equipment that can stop overpainting or overspraying areas, especially around awkward corners. When painting a house, it is difficult and time-consuming to mask off and protect certain surfaces. With a paint shield, painting or spray painting requires less preparation, while still providing the necessary protection of unwanted splattering or overpainting on adjacent surfaces.

For example, a paint shield can be used on a roof. In order to protect the shingles on a roof and prevent any painting over the shingles, a paint shield can be slipped underneath the flashing and the shingles. This allows the wall, fascia, soffits, or another nearby surface to be painted without worry over also painting on an adjacent surface. Cardboard shields can be used, however, cardboard spray shields cannot be used more than once. Aluminum shields, by contrast, have handles, that gives more flexibility. However, a user will be required to hold it as she works, keeping it in position with one hand as the other hand is painting. This can be quite tiresome on the arms, and will hinder efficiency, as frequent breaks are needed due to fatigue.

The present invention provides a solution and allows for a paint shield to be repeatedly used. The present invention provided a paint shield clamp having a clamp with an upper portion, a lower portion, and a rear ledge that can removably mount to the shingles on a roof. The upper portion is substantially rectangular in shape and comprises a first edge and a second edge. The lower portion comprises a third edge and a fourth edge. The third edge is attached to the second edge of the upper portion. The fourth edge is offset from the interior surface of the upper portion to form substantially a C-shape and an opening between the upper portion and the lower portion. The rear ledge is attached to the second edge of the upper portion and extends coplanar to the upper portion. An elongated handle is pivotally attached to the rear ledge.

Description of the Prior Art

Devices have been disclosed in the prior art that relate to paint shields. These include devices that have been patented and published in patent application publications. Some devices disclose a shield with a flat reinforcing member attached to an elongated handle, with at least one spring clip mounted on the reinforcing member. Other devices discloses a paint shield with a shield portion and a substantially W-shaped exterior-roof attachment. These devices, however, do not disclose a paint shield that includes a clamp that can mount to the shingles on a roof without needing any additional support. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 7,854,212 to Queiroz discloses a paint shield configured to shield an exterior roof structure while spray painting exterior side walls of a home or building. The Queiroz device includes a shield portion and an exterior-roof attachment portion. The shield portion is configured to shield at least a portion of the roof structure from paint spray. The exterior-roof attachment portion is connected to the shield portion and includes a substantially W-shaped cross-section configured to attach and be self-held to the drip edge of a pitched roof of the home. However, the Queiroz device does not disclose a handle or a shield that clamps to the shingles on a roof.

Similarly, U.S. Pat. No. 4,085,703 to Glowacki discloses a spray painting shield that includes a flat reinforcing member attached to an elongated handle. The reinforcing member is attached to one end of the elongated handle through a pivot shaft. At least one spring clip mounted on the flat reinforcing member is used to hold large flat shields and preventing paint from getting on selected areas. The Glowacki device does not disclose a shield that can clamp to the shingles on a roof when the wall, fascia, or another nearby surface is being painted.

U.S. Pat. No. 5,103,762 to Long discloses a spray paint shield for protectively covering a portion of a wall or ceiling when an adjoining wall portion is being painted or sprayed. The Long device discloses a flat, elongated thin sheet and an elongated handle pivotally connected to and extending from the midpoint of an edge of the flat sheet. Elongated handle is movably within a plane defined by the edge of the thin sheet attached thereon. Unlike the current device, the Long device does not disclose a shield having a clamp portion that can removably clamp to the shingles on a roof.

U.S. Pat. No. 8,104,426 to Gringer discloses a paint shield that includes a shielding member with a leading edge and a base member, an extension handle, a pivot member connected to the base member for angular positioning of shielding member, and a storage location within the base member for storing the pivot member and extension handle when the pivot member is removed from the base member. The Gringer device, however, does not disclose a shield that can clamp to the shingles on a roof.

Finally, U.S. Pat. No. 6,808,794 to Mattox discloses a substantially T-shaped paint shield that includes a major portion and a secondary portion integrally attached. The shield is flexible and bendable to allow it to conform to a corner during painting. However, the Mattox device does not disclose a paint shield having a substantially C-shaped clamp that is designed to clamp to the shingles on a roof.

The devices disclosed in the prior art have several known drawbacks. These devices, however, are limited as they do not disclose a paint shield that includes a clamp that can mount to the shingles on a roof without needing any additional support. The paint shield clamp comprises a clamp with an upper portion, a lower portion, and a rear ledge that can removably mount to the shingles on a roof. The upper portion is substantially rectangular in shape and comprises a first edge and a second edge. The lower portion comprises a third edge and a fourth edge. The third edge is attached to the second edge of the upper portion. The fourth edge is offset from the interior surface of the upper portion to form substantially a C-shape and an opening between the upper portion and the lower portion. The upper portion is designed to be placed in contact with the shingles on a roof, while the opening is designed to receive therein a portion of the shingles therein. It is therefore submitted that the present invention is substantially divergent in design elements from the prior art, and consequently it is clear that there is a need in the art for an improvement to paint shields and accessories. In this regard, the instant invention substantially fulfills these needs.

SUMMARY OF THE INVENTION

In view of the foregoing disadvantages inherent in the known types of paint shields now present in the prior art, the present invention provides a new and improved painting shield that is designed to mount to the shingles on a roof without needing any additional support.

It is therefore an object of the invention to provide a new and improved paint shield clamp that has all of the advantages of the prior art and none of the disadvantages.

Another object of the present invention is to provide a new and improved paint shield clamp that comprises a clamp substantially in a C-shape having an upper portion, a lower portion, and a rear ledge.

Yet another object of the present invention is to provide a new and improved paint shield clamp that is designed to clamp to the shingles on a roof without needing any additional support.

Still yet another object of the present invention is to provide a new and improved paint shield clamp wherein the upper portion is rectangular shaped and includes a first edge and second edge.

Another object of the present invention is to provide a new and improved paint shield clamp wherein the lower portion is attached to the second edge of the upper portion by a third edge and further includes a fourth edge that is offset from the interior surface of the upper portion to form an opening between the upper portion and the lower portion.

A further object of the present invention is to provide a new and improved paint shield clamp wherein the rear ledge is attached to the second edge of the upper portion and extends in a coplanar manner therefrom.

Yet a further object of the present invention is to provide a new and improved paint shield clamp that is also designed to protect other adjacent surfaces, such as walls, molding, or carpet.

Still yet another object of the present invention is to provide a new and improved paint shield clamp wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
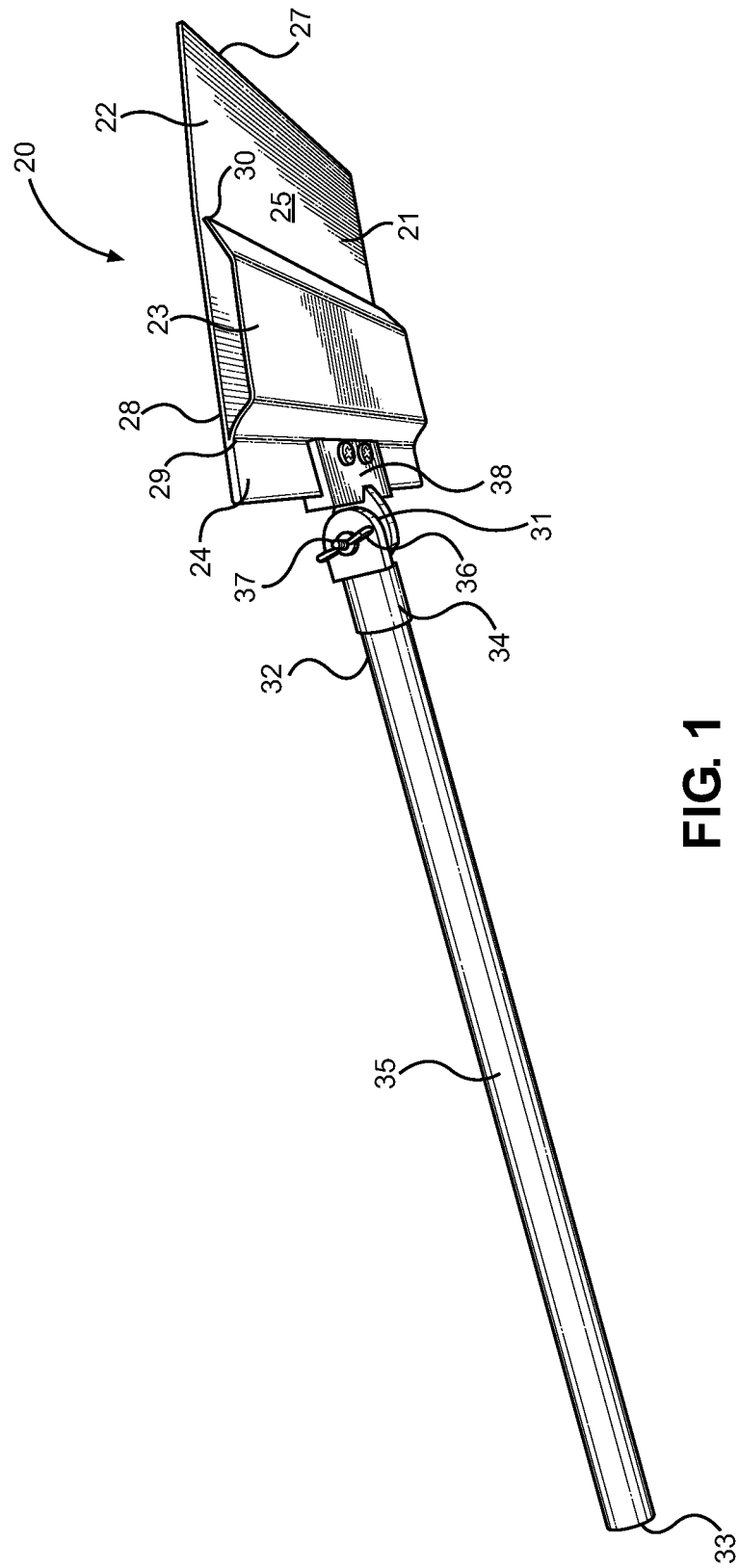
FIG. 1 shows a side perspective of the preferred embodiment of the present invention.

References are made herein to the attached drawings. Like reference numerals are used throughout the drawings to depict like or similar elements of the paint shield clamp. For the purposes of presenting a brief and clear description of the present invention, the preferred embodiment will be discussed as used to provide a shield and protection of unwanted paint splatter and overpainting on adjacent surfaces such as roof shingles, walls, carpet, and molding. The figures are intended for representative purposes only and should not be considered to be limiting in any respect.

Referring now to FIG. 1, there is shown a side perspective of the preferred embodiment of the paint shield clamp 20. The paint shield clamp 20 comprises a clamp 21 having substantially a C-shape with an upper portion 22, a lower portion 23, and a rear ledge 24. The upper portion 22 is rectangular in shape and has an interior surface 25 and an exterior surface. The upper portion 22 also comprises a first edge 27 and a second edge 28. The lower portion 22 is substantially trapezoidal in shape and comprises a third edge 29 and a fourth edge 30. The third edge 29 is attached to the second edge 28 of the upper portion 22, wherein the lower portion 23 extends outwardly beyond the upper portion 22. The fourth edge 30 is offset from the interior surface 25 of the upper portion 22 to form an opening between the upper portion 22 and the lower portion 23. The rear ledge 24 is attached to the second edge 28 of the upper portion 22, wherein the rear ledge 24 is coplanar and extends rearwardly from the upper portion 21.

Those skilled in the art will recognize, or be able to ascertain using no more than routine experimentation, the offset distance between the fourth edge 30 and the interior surface 25 of the upper portion 22 to form an opening between the upper portion 22 and the lower portion 23. Those of ordinary skill in the art will also readily envision a variety of other offset distances, or substantially equivalent thereto. It is not desired to limit the exact offset distance between the fourth edge 30 and the interior surface. Rather it is desired to disclose and claim a fourth edge 30 that is offset from tine interior surface 25 of the upper portion 22 for obtaining the results and the advantages described herein. These modifications and variations are deemed to be within the scope of the inventive embodiments described herein.

In some embodiments, clamp 21 is composed of a rectangular metal sheet that is substantially folded over onto itself to form the upper portion 22, the lower portion 23, and the rear ledge 24. However, in other embodiments clamp 21 can also be molded into shape. Clamp 21 is preferably composed of aluminum, however, without limitation, other embodiments may include other metals or plastics that are noncorrosive and suitable for its purpose.

Lower portion 23 is substantially shaped like a trapezoid without the base. The fourth edge 30 of the lower portion 23 is not placed in contact with the upper portion 22 to form an opening between the upper portion 22 and the lower portion 23. The opening is designed to allow for the clamp 21 to receive therein the flashing and/or shingles on a roof to prevent any overpainting of the shingles, when walls, fascia, soffits, or any other adjacent surfaces to the roof are being painted. The upper portion is placed plush on the exterior side of the shingles. The opening is designed to receive a portion of the shingles therein with the fourth edge 30 placed in contact with the underside of the shingles. In this manner, the clamp 21 is self-supporting and does not require any additional support to be held in place.

In addition, an elongated handle 35 is pivotally attached to substantially the center of the rear ledge 24. The elongated handle 35 further includes a terminal end 32 and a free end 33, wherein the elongated handle 35 is designed to allow the user to support the paint shield clamp 20 in a variety of angles. The terminal end 32 of the elongated handle 35 further comprises a pivot 31. The pivot 31 comprises a circular recess 34 that is designed to telescopically receive and secure the terminal end 32 of the elongated handle 35. Terminal end 32 can be secured to the circular recess 34 by a waterproof adhesive, such as wood glue, however, other embodiments use other suitable types of adhesives.

Pivot 31 further comprises fastener 38 that is designed to removably secure to the rear ledge 24. The fastener 38 is preferably a screw clamp that is substantially C-shaped and comprises threaded elements to removably secure the rear ledge 24 to the fastener 38. In addition, pivot 31 also is designed to allow the elongated handle 35 to pivot and rotate about a single plane. Preferably, the pivot 31 is a clevis fastener or knuckle joint, however, any joint that allows rotation about a singular plane may be used. The pivot 31 preferably also comprises a wing nut 36 and screw 37 to removably secure and lock the rotation of the pivot 31. Wing nut 36 includes a push-through bush with male threaded elements, whereas the screw 37 includes aligning female threaded elements. Without limitation, other embodiments use other types of suitable adjustable nuts to removably secure the positioning of the elongated handle 35 in relation to the pivot 31.

Figure 2:
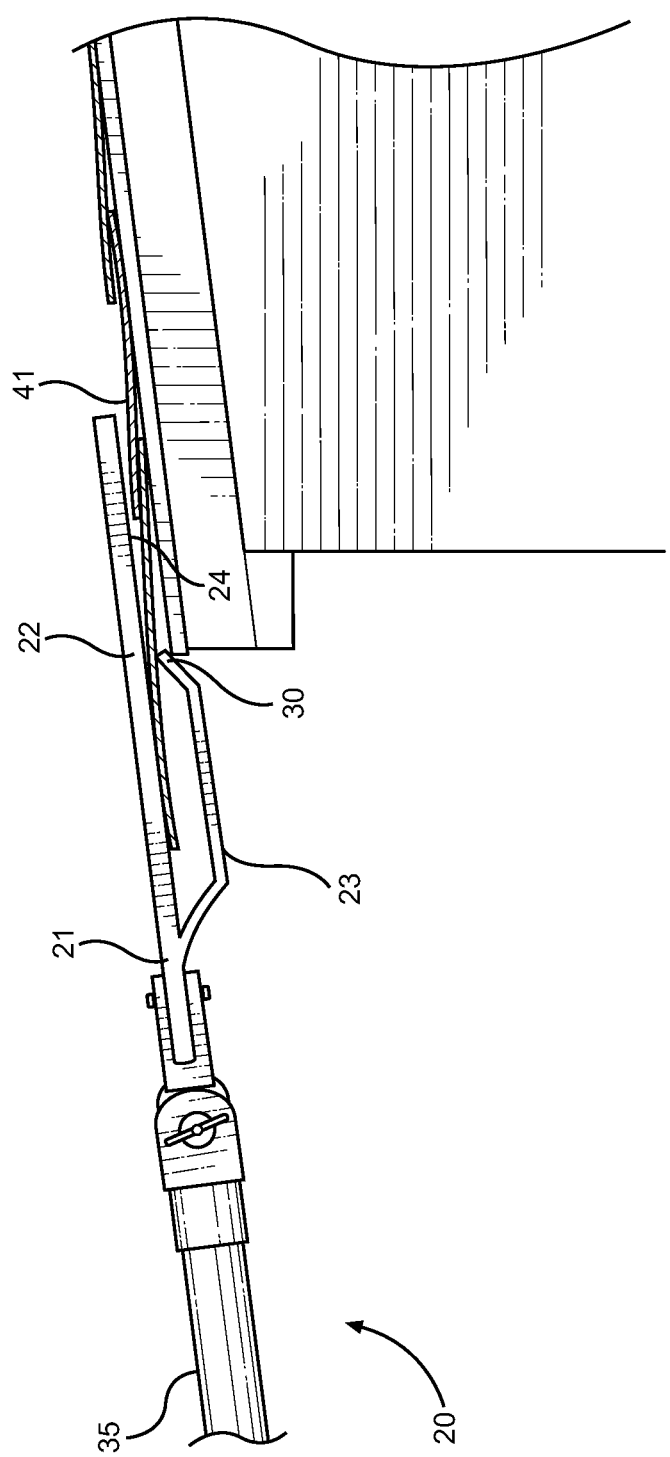
FIG. 2 shows a worm's eye view of the preferred embodiment of the present invention as mounted on the shingles on a roof.

Referring to FIG. 2, there is shown a worm's eye view of the preferred embodiment of the paint shield clamp 20 as removably mounted on the shingles 41 on a roof without requiring any additional support. The upper portion 22 is placed plush over the roof, whereas the lower portion 23 is positioned underneath the protruding shingles 41 on a roof, specifically with the fourth edge 30 placed in contact with the underside of the shingles 41. In this manner, the clamp 21 allows the shingles to be received therethrough the opening between the upper portion 22 and the fourth edge 30 of the lower portion 23. The lower portion 23 is designed to protect the shingles 41 from any unwanted overpainting and splattering, while painting the fascia, soffits, or any adjacent surfaces of the roof. In the illustrated embodiment, the clamp 21 can mount to the shingles 41 on a roof and hang therefrom without any additional support. A user then uses the elongated handle 35 to slide the clamp 21 along the shingles 41 on the roof while painting to protect the shingles on a roof from unwanted overpainting and splatter.

Figure 3:
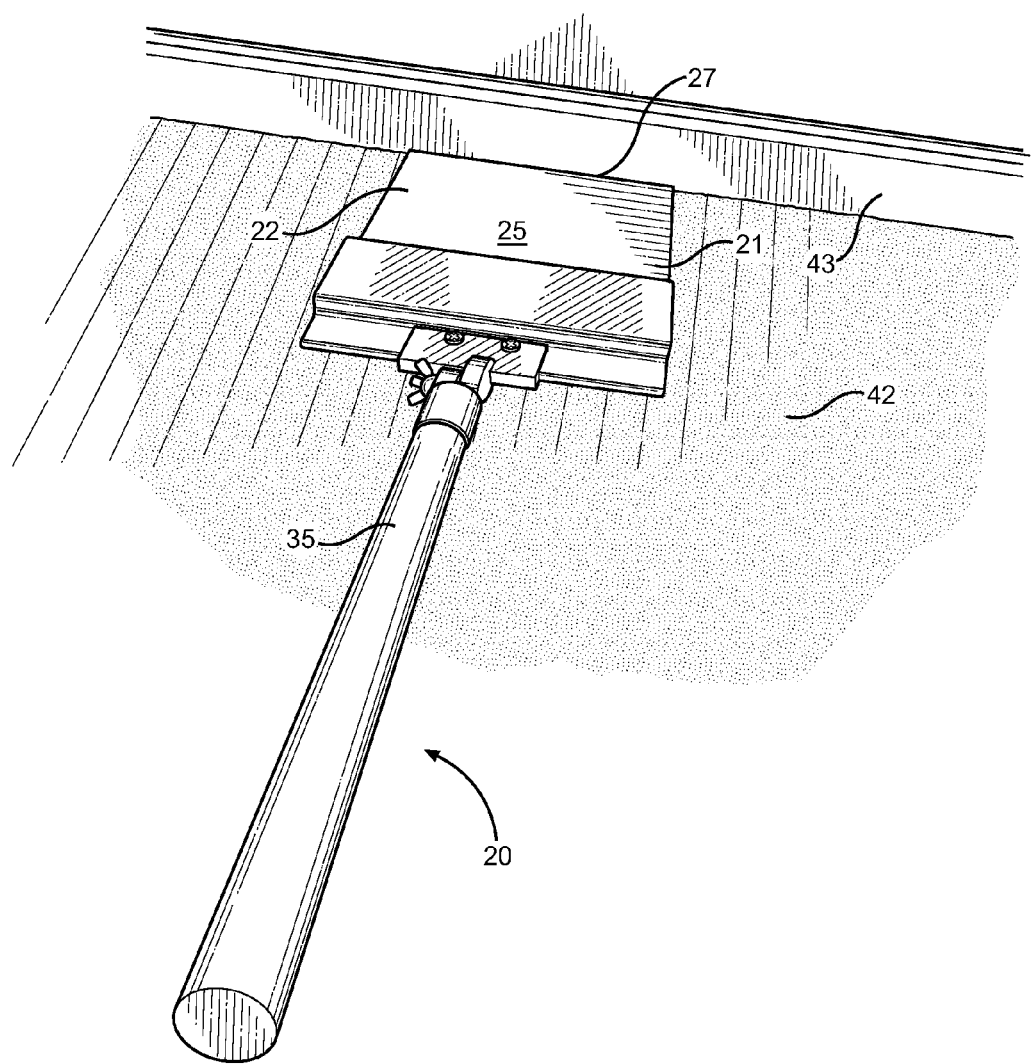
FIG. 3 shows a perspective of the preferred embodiment of the present invention as used to prevent splatter and overpainting on carpets.

Referring now to FIG. 3, there is shown a perspective of the paint shield clamp used as a shield to protect the carpet 42 while painting the wall molding 43 on the wall. The first edge 27 on the upper portion 22 is placed in contact with the corner where the wall molding 43 meets the carpet 42. The first edge 27 and interior surface 25 of the upper portion 22 protect and shield the carpet 42 from any unwanted overpainting and splatter onto the carpet 42. The clamp 21 can also be rotated, wherein the first edge 27 and the exterior surface of the upper portion prevent overpainting or dripping onto the carpet 42, while painting an adjacent surface. Carpet 42 is exemplary of a floor surface the clamp 20 can protect, however, without limitation, other appropriate floor surfaces can be protected.

Furthermore, the elongated handle 35 is graspable by hand, wherein the user can grip the elongated handle 35 to slide the first edge 27 along the corner between the carpet 42 and the wall molding for continuous painting of the wall molding 43, as well as continuous protection of the adjacent carpet 42. When the user has accumulated some paint on the clamp 21, a cloth doused in water can be used to clean or wipe off the paint. The clamp 21 may need to be cleaned frequently to prevent any bleeding or dripping of paint from the clamp 21.

Figure 4:
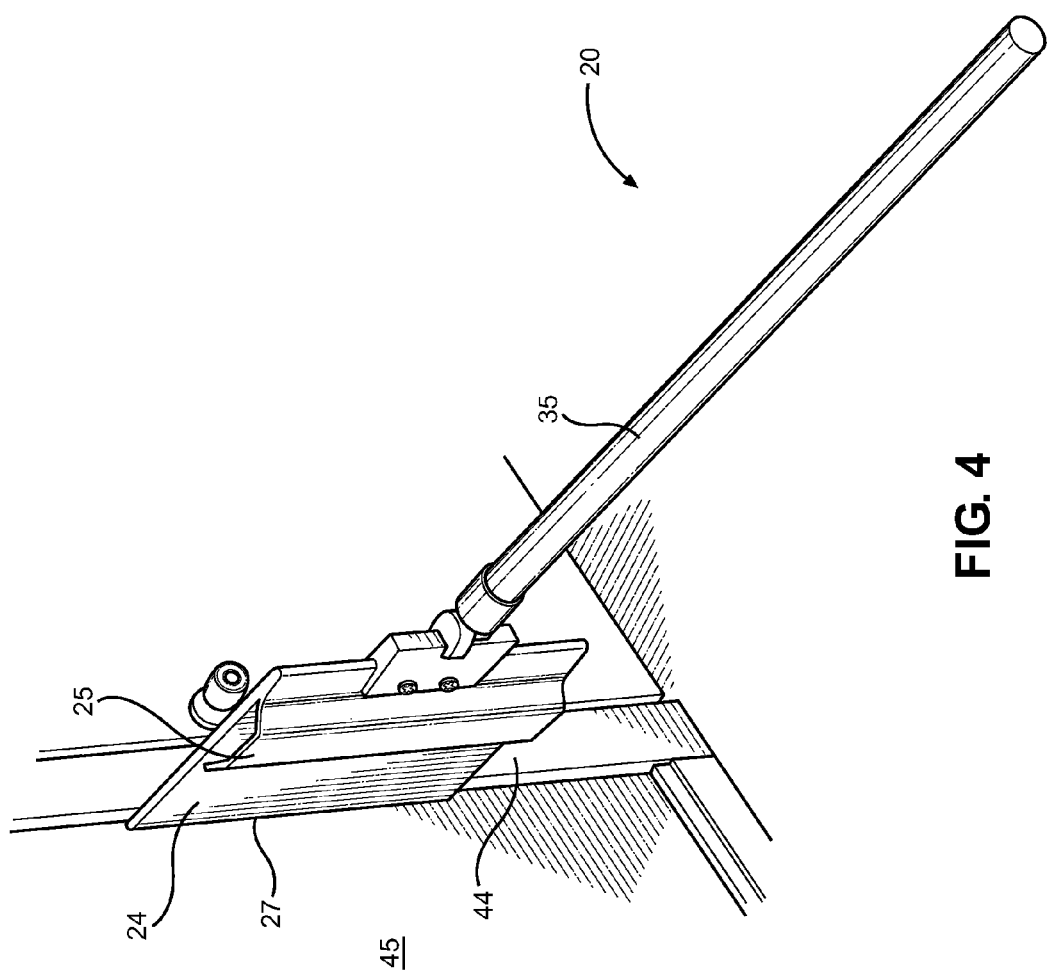
FIG. 4 shows a side perspective of the preferred embodiment of the present invention as used to prevent splatter and overpainting on door molding when painting an adjacent wall.

In addition, in FIG. 4, there is shown another perspective of the paint shield clamp 20 as utilized for protecting the door molding 44 when painting an adjacent wall 45. The first edge 27 is placed at the corner where door molding 44 and wall 45 meet. The first edge 27 can either be placed at an angle or plush to the door molding 44 to protect door molding 44 while painting the adjacent wall 45. The first edge 27 can also be used to protect the adjacent wall 45 if the desire is to paint the door molding 44 instead of the adjacent wall 45. The elongated handle 35 is used to slide the edge 27 along the door molding 44 for continuous shielding of the adjacent wall 45 or door molding 44 while painting one of the surfaces.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A paint shield clamp, comprising:
   a planar upper portion including a first edge, a second edge, and an interior surface, the first edge extending perpendicularly relative to the second edge;
   a lower portion including a third edge and a fourth edge, the lower portion affixed to the interior surface of the upper portion at the third edge;
   wherein the lower portion extends outwardly relative to the interior surface of the upper portion;
   wherein the planar upper portion extends outwardly beyond the fourth edge of the lower portion;
   wherein the lower portion defines an interior volume disposed between the interior surface of the upper portion and the third edge and the fourth edge of the lower portion;

wherein the lower portion includes a longitudinal length equal to a longitudinal length of the upper portion, such that the lower portion is coextensive in length with the upper portion and the fourth edge spans the longitudinal length of the upper portion;

wherein the fourth edge is offset from the interior surface of the upper portion forming an opening disposed between the upper portion and the fourth edge that provides access to the interior volume of the lower portion;

a rear ledge affixed to the upper portion and the lower portion at the third edge, the rear ledge coplanar with the upper portion and extending rearward relative to the first edge;

a pivot affixed to a center of the rear ledge; and an elongated handle pivotably connected to the rear ledge via the pivot, the pivot configured to adjust the angle of the elongated handle relative to the upper portion.

2. The paint shield clamp of claim 1, wherein the pivot includes a recess for receiving the elongated handle.

3. The paint shield clamp of claim 2, wherein the pivot further includes a fastener for removably securing the pivot to the rear ledge, and a wing nut and a screw configured to threadably engage for adjustably locking the elongated handle at a desired angle relative to the upper portion.

4. The paint shield clamp of claim 3, wherein the wing nut includes a push-through bush including male threaded elements and the screw includes female threaded elements.

5. The paint shield clamp of claim 3, wherein the fastener comprises a screw clamp.

6. The paint shield clamp of claim 1, wherein the pivot comprises a clevis fastener.

7. The paint shield clamp of claim 1, wherein the pivot comprises a knuckle joint.

* * * * *